(12) United States Patent
Ange (10) Patent No.: US 7,819,447 B1
(45) Date of Patent: Oct. 26, 2010

(54) HAND ACTUATED SOIL DISPLACEMENT AND PLANTING DEVICE

(76) Inventor: Wayne Ange, 4306 Fontana Ave., Chesapeake, VA (US) 23325

( * ) Notice: Subject to any disclaimer, the term of this patent is extended or adjusted under 35 U.S.C. 154(b) by 0 days.

(21) Appl. No.: 12/462,298

(22) Filed: Aug. 1, 2009

(51) Int. Cl.
*A01B 1/02* (2006.01)

(52) U.S. Cl. .................................. 294/50.9; 294/50.8

(58) Field of Classification Search ............... 294/50.7, 294/50.8, 50.9, 55, 57; 172/22
See application file for complete search history.

(56) References Cited

U.S. PATENT DOCUMENTS

| 1,407,232 | A | * | 2/1922 | Stevens | 294/50.9 |
| 3,369,834 | A | * | 2/1968 | Miles | 294/50.9 |
| 6,439,629 | B1 | * | 8/2002 | Bieth | 294/50.9 |

* cited by examiner

*Primary Examiner*—Paul T Chin
(74) *Attorney, Agent, or Firm*—Bradley D. Goldizen (57) ABSTRACT

A gardening implement includes a pair of shovels arranged at one end of a handle assembly. The handle assembly includes a spring loaded actuation mechanism that biases the device towards an open position. A bottom end of the handle is fixed to an upper end of one of the shovels. The actuation mechanism includes an upper end that pivotally connects substantially near a grip end of the handle via a hinge. In the preferred embodiment, a second hinge is arranged within the actuation mechanism which further extends through an eyelet affixed between the grip end of the handle.

10 Claims, 6 Drawing Sheets

HAND ACTUATED SOIL DISPLACEMENT AND PLANTING DEVICE

There are no related patent applications.

The present application was not subject to federal research and/or development funding.

TECHNICAL FIELD

Generally, the present invention relates to gardening tools. More specifically, the invention is a novel hand actuated device for creating an opening in soil by removal or displacement of a portion of the soil. The device is superior to existing devices and more useful for removing a plug of soil which may include an organic specimen such as a weed or other undesirable object, and thereafter depositing a seed, bulb, or plant into an opening in the soil created by the removal of the plug of soil or displaced portion of the soil. The device is a uniquely shaped two shovel device that is actuated by squeezing the handle. Each shovel has a free end that is inserted into the soil and which is curved when viewed from the free end. When actuated, the shovels are forced downward by the weight of the user into the soil. The device is then rotated via twisting the handle elements about a centrally located axis extending lengthwise from the handle to the free cutting ends of the shovels and arranged substantially in the center of the tool. The handle includes one or more portions which extend in a radial direction from the centrally located axis. After inserting the tool into the dirt, the handle may be twisted to cause the lengthwise cutting edges of each shovel to cut the soil. Otherwise, the free ends of the shovels may be withdrawn from the soil and the tool rotated such that the free ends cuts portions of the soil to create a complete circular plug which may be removed by thereafter squeezing the handle of the tool to cause the free ends of the shovels to move towards one another, and withdrawn in an upward direction if working in compacted soil. In loose soil, the free ends are inserted into the soil and the tool is rotated to cut the soil that comes into contact with the lateral or lengthwise cutting sides of the shovels. The handle is then squeezed causing the shovels to move towards one another to cut and contain a plug of soil which is displaced from the surrounding soil. The offset portion of the handle extends substantially perpendicular to the central axis and optimizes the operability of the tool. The actuation mechanism of the handle assists the user when pulling the plug of soil from the ground as upward forces directed through the arm of the user causes the second element of the handle to be pulled towards the first element. It is therefore unnecessary for the user to have very strong hand muscles to operate the tool. As the actuation mechanism is arranged to be squeezed by a user's hand such that the second element moves towards the first element which is arranged in the palm of the user's hand, pulling upwards to remove the plug of soil assists this squeezing action of the user.

BACKGROUND OF THE INVENTION

The planting of bulbs, seedlings, seeds and the like are an important part of modern society. Such planting is useful in landscaping as well as the production of garden vegetables. Thus, it is a continuing endeavor to create a reliable garden tool satisfying many of a lay gardener's need for planting and transplanting vegetation. To that end there are several types of known garden trowels. By way of representation, some of these include U.S. Pat. No. 6,027,153 to Marshall which is a garden trowel that includes a handle, a blade, and a connection member interconnecting the handle and the blade. The handle has a length which accommodates the use of two hands. The blade includes a body portion and a stem portion. The body portion of the blade has a beveled edge. The stem portion of the blade is bent and attached to the connection member to effectively offset the blade from the handle along a longitudinal axis. In Marshall, the handle is rotationally offset in a range between about four and about six degrees with respect to a vertical plane intersecting the longitudinal axis (to the right for a right handed trowel and to the left for a left handed trowel). The handle includes an increasing, graduated size of the handle that extends from a forward end of the handle to a rear end of the handle. The forward end of the handle is connected to the blade via the connection member. The rear end of the handle includes first and second tapering, flattened sides which greatly increase the grip and turning power of the blade of the trowel much facilitating any kind of digging encountered.

U.S. Pat. Ser. No. 637,464 to Hostetter and Kline is a plant setter or transplanter having two trowels and presser plates with scrappers that are arranged at a lower end of a body. The invention operates to make a hole in the ground and set a plant therein. Thereafter, the soil is compacted around the plant by simple downward pressure on an outer end of a hand lever.

U.S. Pat. No. 1,895,214 to Stork discloses a transplanter having two elongated handles having the lower ends attached to shovels.

U.S. Pat. No. 5,431,467 to Mlecka discloses a combined weed extractor, seed planter and hole digger extracting weeds, digging holes, planting seeds, and other small excavations. The lawn and gardening device has a pair of jaws at one end to clamp onto a weed whereby the user first pulls outwards, and then upwards on a pair of handles provide to extract the weed. Holes are dug in the same fashion by simply repeating the above steps in the same location. Seeds are planted by placing a seed into an opening provided at the top end of the pole whereby the seed is guided down the hollow cavity of the pole into the mouth portion and into the hole. The lawn and gardening device comprises a pair of jaws, a pair of hollow poles, two handles, an opening at the top end of the poles, a flexible coupler and spacing means, and jagged teeth around the perimeter of each jaw.

U.S. Pat. No. 6,966,269 to Sawatzky et al. teaches a multipurpose gardening tool including a pair of blade assemblies wherein, each blade assembly includes a handle portion, a shank portion and a contoured blade portion wherein, the shank portions are pivotally secured to one another and, wherein each of the contoured blade portions define one-half of a hollow fructro-conical configuration and the rear edges of the blade portions and the interior faces of the shank portions are sharpened to function as scissors.

U.S. Pat. No. 2,149,880 to Boordsen discloses a soil opener for planting bulbs. The soil opener includes curved pointed jaw members that when closed form a pointed structure and when open create a substantially cylindrical shape. A lower end of a handle member is attached to the upper part of a jaw by means such as a rivet.

U.S. Pat. No. 6,338,512 to Ruppert et al. teaches a clamp action shovel for single hand operation for digging holes. The shovel has an H-shaped frame providing at one end, a handle integrally joined to the frame, and at the other end, a blade mounting support. A pair of spaced apart shovel blades pivotally engages the blade mounting support for drawing the blades from essentially parallel rest positions, toward each other, to form a modified cone-shaped enclosure. A draw arm assembly is engaged for sliding within a pair of opposing slots in the H-shaped frame. The draw arm assembly is engaged with the shovel blades through a pair of links to move the shovel blades toward each other when the draw arm assembly is pulled toward the handle.

The present invention teaches a device that can be more easily used than the aforementioned devices. Moreover, the device is cheap to produce, easy to use, and requires minimal amount of hand strength for operating it.

SUMMARY OF THE INVENTION

A hand actuated soil displacement and planting device of the instant invention comprises a compressible handle assembly that, when compressed, actuates a pair of cutting blades or shovels. The handle assembly has a first member and second member biased apart from one another. A user grasps the first and second member in his or her hand and squeezes them towards one another to actuate the device. That is, the device is grasped by the handle with a single hand of a user such that the first member is arranged in the user's palm. The first and second members are squeezed to overcome the spring biased force which biases the shovels towards an open position where the free ends are at an absolute maximum distance from one another. When the spring bias force is overcome, the ends of the blades move or come near one another. When squeezed, the handle actuates cutting ends of the spring biased pair of shovel blades towards one another to retain a plug of soil there between.

Otherwise, the handle may be compressed and the rounded cutting ends of the shovels driven into soft soil. Thereafter, the handle may be released to create an opening in the soil into which a bulb, seedling, seed or the like may be deposited. The bulb, seedling, seed, or the like may be deposited through a circular opening created by fixed ends of the shovel blades opposite the rounded cutting ends which are free. The rounded cutting ends of the shovel blades may be withdrawn from the soft soil causing the walls of the opening in the soil to collapse over the bulb, seeding, seed or the like to plant it. Each shovel comprises a blade having longitudinal cutting edges bridged by a rounded cutting end distal from the handle.

It is an object of the invention to provide a gardening device that may be pressed into soft soil with the handle compressed. Thereafter, the handle is released to create a substantially circular opening. A bulb, seed or seedling may thereafter be deposited through a substantially circular opening created by the collar of the device arranged at a top edge of the blades. The device may be withdrawn from the soil causing the soil to cover the bulb, seed, or roots of the seedling without the need for soiling one's hands.

It is an additional object of the invention to provide a gardening device that may be utilized in either soft or hard soil for cutting and removing a plug of soil to create an opening into which a bulb, seed, or seedling may be deposited where the cutting process of the plug is aided by the withdrawal technique of the user.

Further objects, features and advantages of the invention will become apparent from a consideration of the following description and the included claims when taken in connection with the previous discussion and the accompanying drawings. The above explanations are provided to illustrate the utility of the invention. And, by no means necessary are these explanations intended to limit the application of this invention from being used for other purposes.

DETAILED DESCRIPTION OF THE INVENTION

The following is the preferred embodiment or best mode for carrying out the invention. It should be noted that this invention is not limited by the discussion of the various embodiments and should only be defined by the appended claims. Moreover, it should be recognized that this invention is not limited by the discussion of the preferred embodiments, but that skilled artisans may easily recognize that certain modifications may be made without deviating from the spirit of the invention. The terms vertical and horizontal are to be given their ordinary meaning with respect to the drawings.

Now turning to the figures, the device 1 includes a handle assembly 5 that comprises a first member 11, a second member 12, a third member 13, a spring 14, a pair of spring washers 17A, 17B and a coupling collar 15. A free end of the first member 11 may include an upturned portion arranged at one end of a horizontal portion of the first member for aiding in squeezing the first member 11 and second member 12 together. Rubber grips 50 may also be added to the first member 11 and second member 12. The first member 11 is formed with an angle, preferably a right angle, separating the horizontal portion from a vertical portion. The end of the vertical portion of the first member 11 opposite the horizontal portion includes a forked end accepts and is fastened to an upper end of one of the shovel blades 16A. A pivot lobe or flattened region having a through opening is included on the vertical member substantially near the horizontal portion for accepting a pivot pin to couple the first member 11 to the second member 12 such that the end of second member 12 pivotally connected to the third member 13 may be pulled upward during actuation of the mechanism 5. That is, one end of the second member 12 may be squeezed towards the horizontal portion of first member 11 to actuate the tool 1. As can be understood by the skilled artisan, the pivot pins connecting the second member 12 to the first member 11 and third member 13 may comprise a rivet, screw-nut assembly, or round metal stock member that is press-fitted into the respective openings.

Figure 1A:
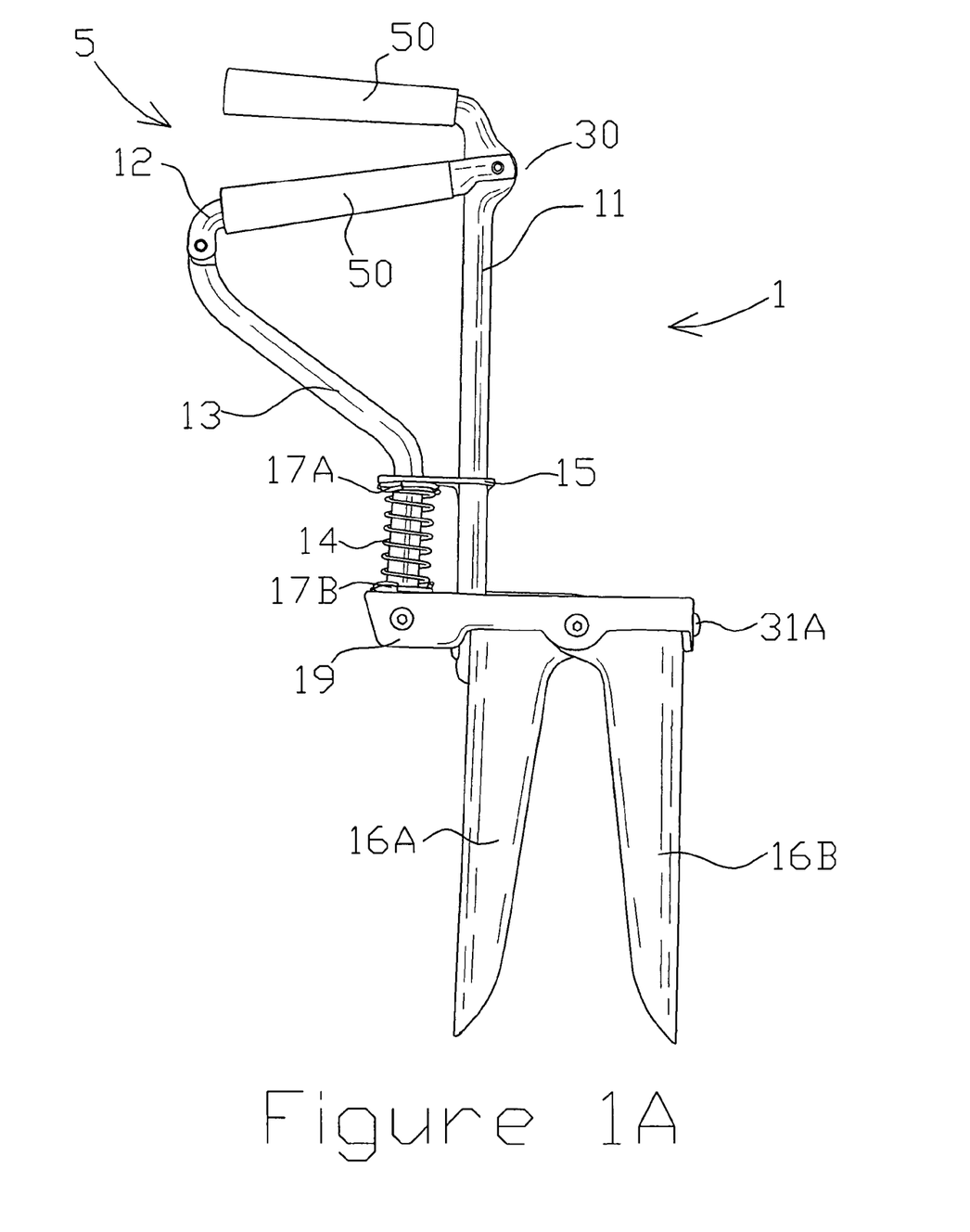
FIG. 1A is a front view of a hand actuated soil displacement and planting device with the shovel blades in an open position.
Figure 1B:
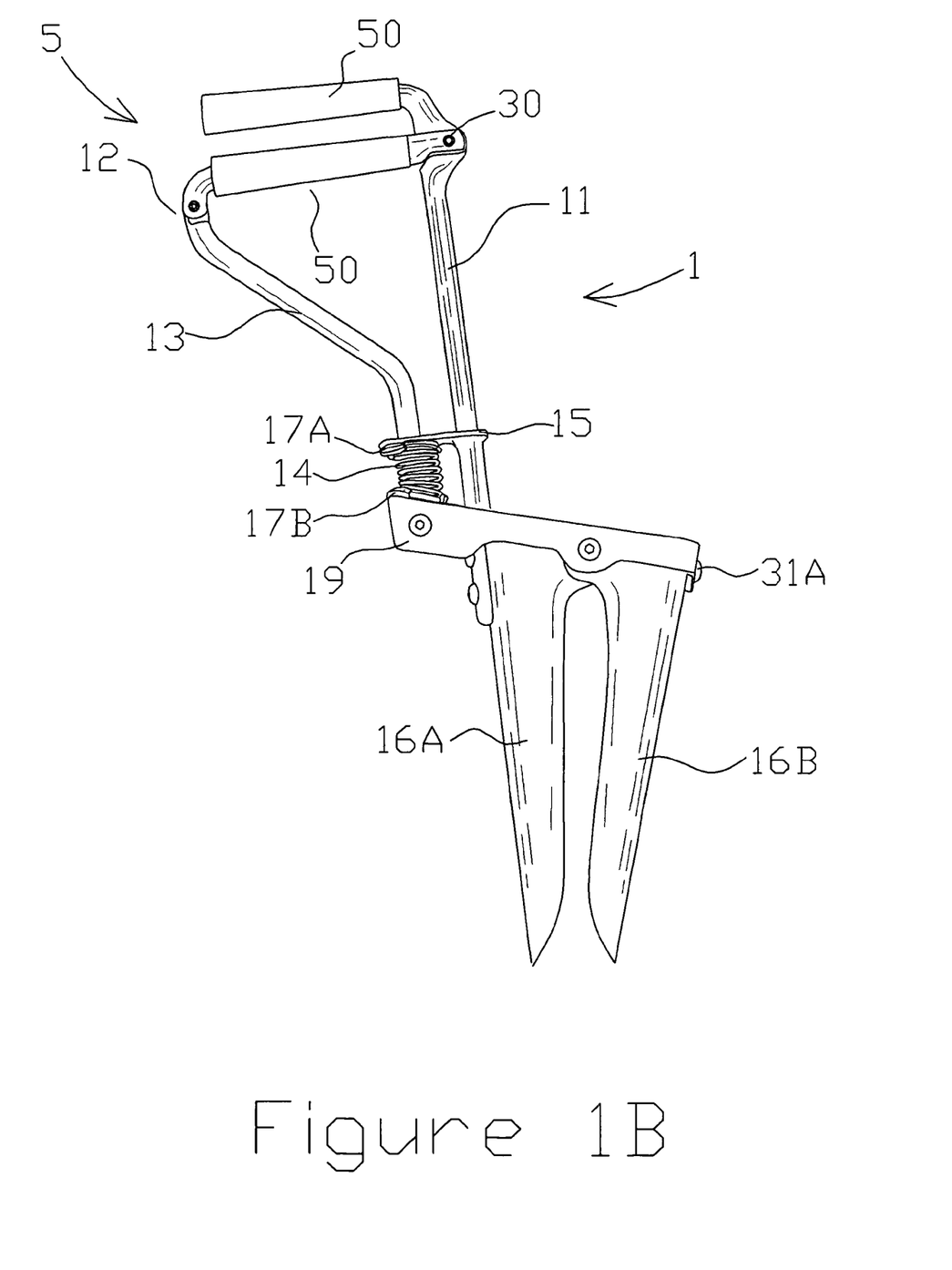
FIG. 1B shows the device in a closed position.

As can be understood by viewing FIGS. 1A and 1B, the first member 11 is arranged in the palm of the user's hand. The user's fingers are wrapped around the second member 12 and closed to squeeze the second member 12 towards the first member 11 to overcome the spring bias force of spring 14 which tends to force shovel blades 16A, 16B apart by pushing against guide collar 15 and collar 19. When squeezed, the second member 12 rotates with respect to first member 11 pulling third member 13 upward to compress spring 14. Collar 15 operates as a guide to ensure proper alignment of the range motion of third member 13 with respect to first member 11. The second member 12 and third member 13 are coupled together via a pivot pin 30 in a manner similar to the connection between second member 12 and first member 11. That is, both ends of the second member may be forked for accepting a flattened region of either first member 11 or third member 13. Spring washers 17A and 17B are arranged at opposite ends of the spring 14 to ensure proper flattening of the spring 14 when the second member 12 is compressed towards first member 11 to ensure that the shovel blades 16A, 16B are biased open.

One end of collar 15 is fastened substantially near a lower end of the first member 11 which is forked. The second end of the collar 15 through which third member 13 passes includes an oversized opening which is larger than the diameter of third member 13. The oversized opening allows for a small amount of horizontal movement of the lower end of the third member 13 to ensure proper operation of the tool 1. In the preferred embodiment, all parts are formed from a metal such as stainless steel. However, it can be recognized that a variety of lightweight durable materials may be utilized in implementing the invention.

The lower end of the third member 13 is coupled to an extended region of the shovel collar 19 via a pivot pin 30. When displaced upward, third member 13 pulls the portion of the shovel collar 19 upward to cause the opposite end to which shovel blade 16B is coupled, to move downward. The shovel blades are coupled together via pivot pins and to the shovel collar 19 such that when the handle assembly is squeezed, the cutting end of shovel blade 16B is displaced towards the cutting end of shovel blade 16A. That is, the distance between the free cutting ends of shovel blades 16A, 16B becomes less when the handle assembly 5 is actuated. The shovel collar 19 may comprise rounded lobe regions having through openings for coupling it to the shovel blades 16A, 16B, collectively referred to herein as shovel blades 16, as shown in the drawings.

As can be understood when viewing FIGS. 1A and 1B, the blades, 16 are biased in an open position with an angle being formed between the horizontal portion of element 11 and element 12. This angle is reduced as element 12 is pulled upward towards element 11 until element 12 is substantially parallel to the horizontal portion of element 11 as shown in FIG. 1B.

Figure 2:
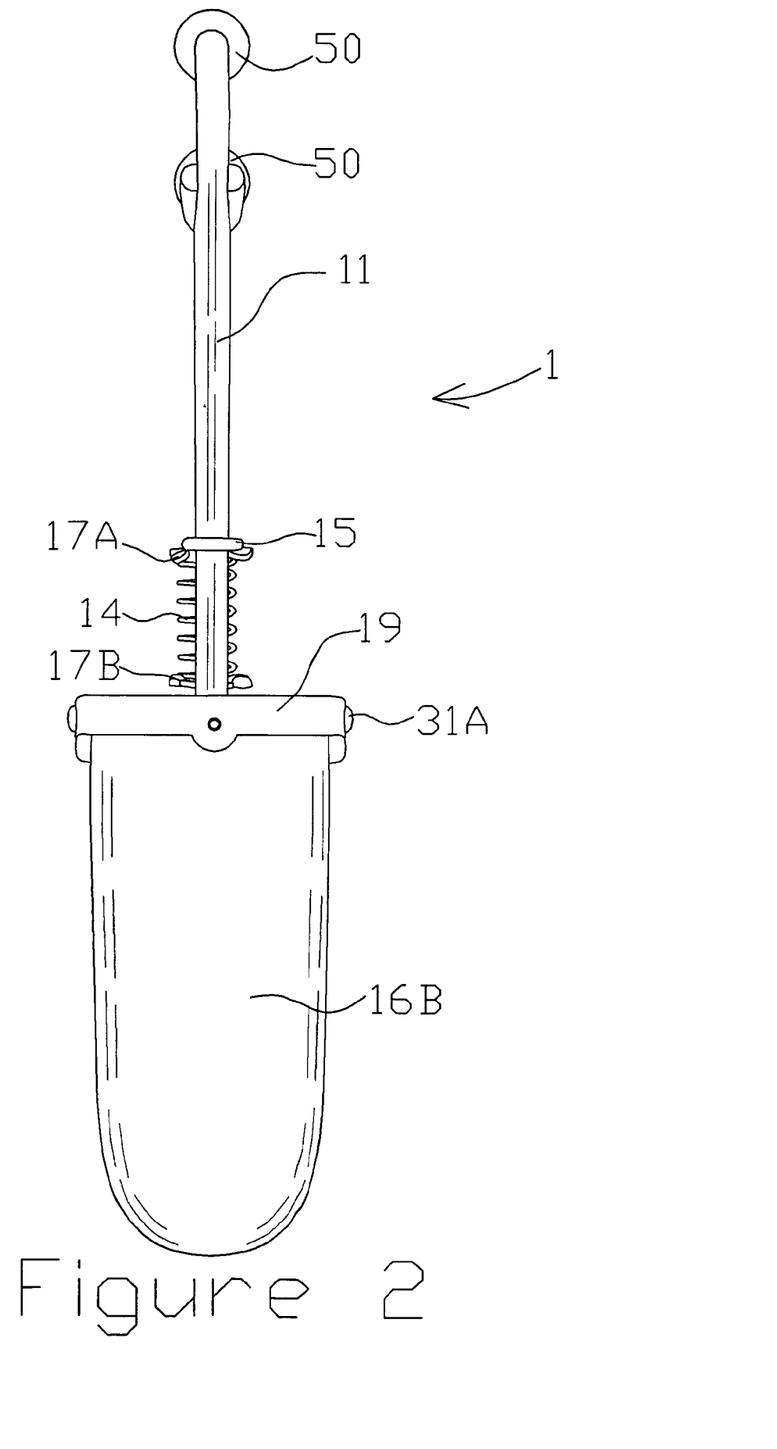
FIG. 2 is a first side view of the hand actuated soil displacement and planting device.
Figure 3:
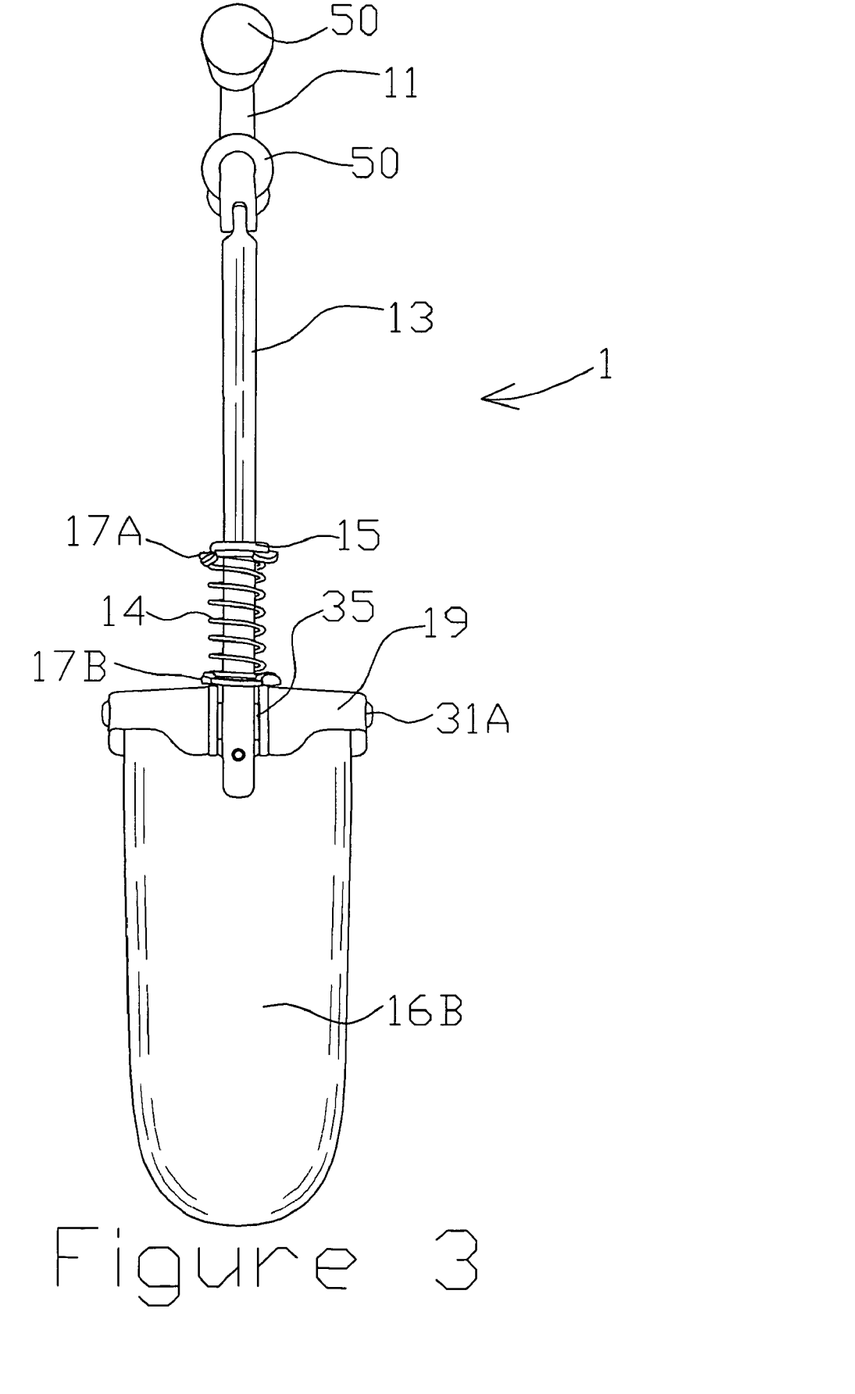
FIG. 3 is a second side view of the hand actuated soil displacement and planting device.
Figure 4:
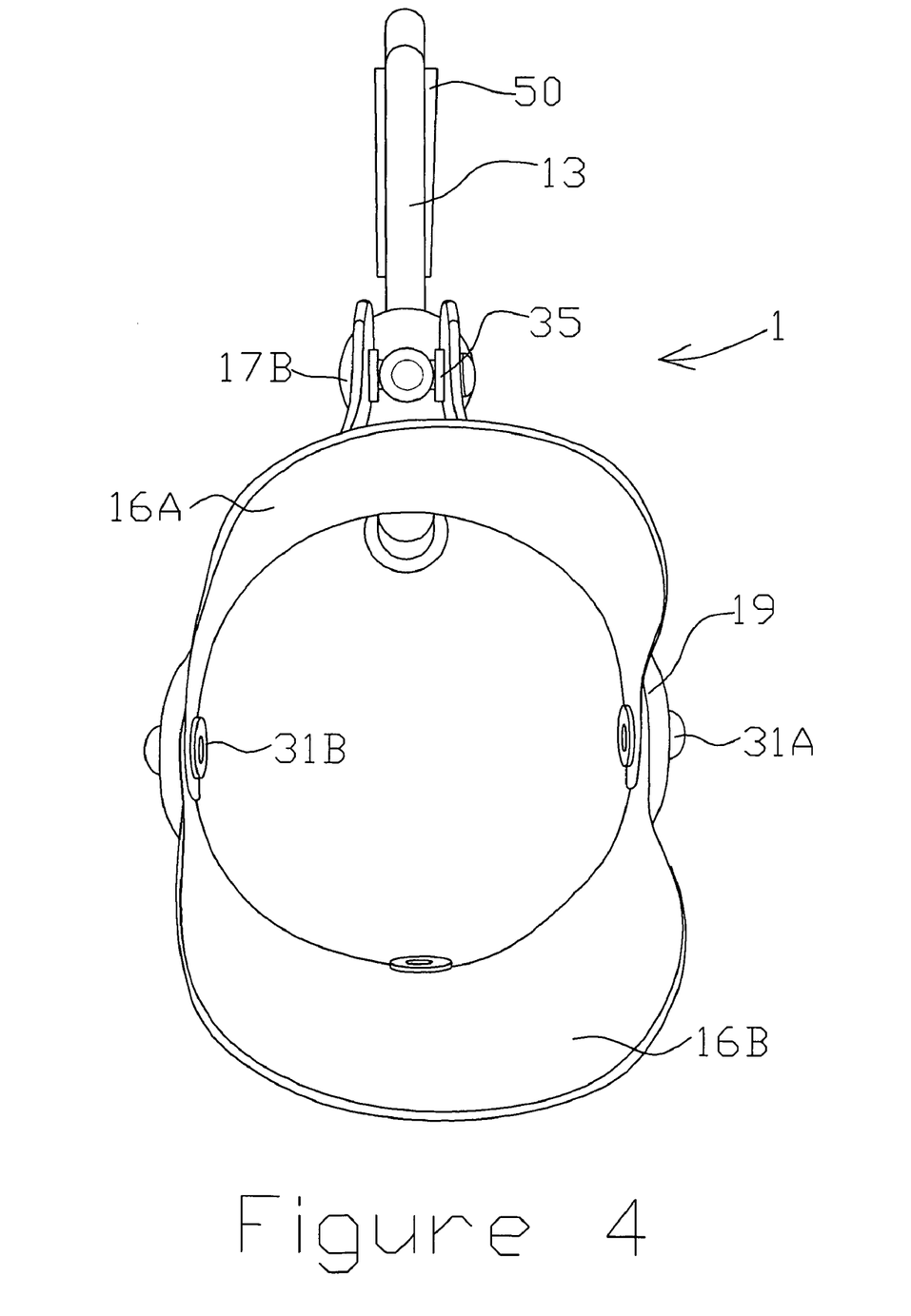
FIG. 4 is an end view of the hand actuated soil displacement and planting device taken from the cutting end of the shovel blades.
Figure 5:
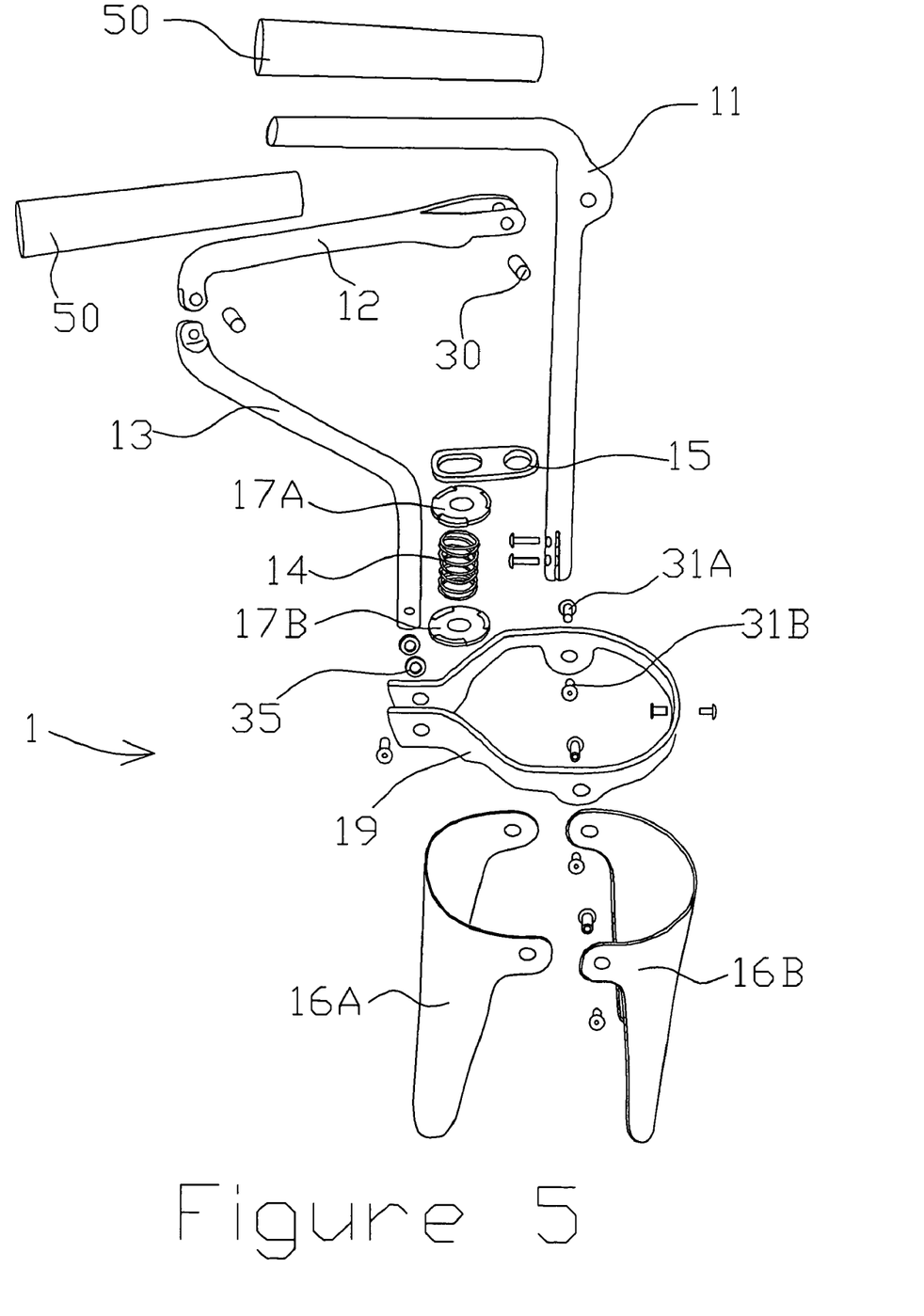
FIG. 5 is an exploded view of the hand actuated soil displacement and planting device.

FIGS. 2-4 depict different views of the tool 1 taken from various respective angles. The exploded view of the various elements is shown in FIG. 5. A pair of rubber handles 50 is arranged about the horizontal portion of the first element 11 and the second element 12 as shown in FIGS. 1-4. The rubber handles 50 are shown as being formed in a cylindrical shape. It should be recognized that they may be formed in a variety of shapes which may include shapes having larger surface areas for distributing working forces necessary for using the tool 1. The first element 11 comprises a horizontal portion formed substantially perpendicular to the vertical portion. A flattened region or lobe is formed with a through opening for accepting a pivot pin to connect the first element 11 with the second element 12. The lobe is formed on the vertical portion near the horizontal portion. A lower end of the vertical portion of the first element is forked and includes through openings for accepting fasteners that couple the first element 11 to an upper edge of shovel blade 16A. Threads may be provided in the through openings for accepting screw type threaded fasteners. Otherwise round metal stock, pins, may be inserted and compressed to fasten the first element 11 to the shovel blade 16A.

The second element 12 includes a pair of forked ends or yokes having through opening for accepting a pivot pin. One yoke is arranged about the lobe of the first element 11 and a pivot pin inserted into the through openings of the opposite sides of the yoke and through the opening in the lobe of the first element. The second end of the second element 12 is formed as a yoke that is substantially perpendicular to the overall length of the second element and includes through openings for accepting a pivot pin to couple the second element 12 to the third element 13.

The third element 13 is formed with an upper end having a narrow enough size to be inserted and fastened between the sides of the yoke of the second end of the second element 12 and secured thereto. The third element 13 is formed with upper and lower ends which are offset with respect to one another and substantially perpendicular as shown. That is, the upper end of the third element 13 is arranged in a vertical manner. The portion of the third element 13 between the upper and lower ends is formed at an angle as shown to offset the upper and lower ends. Through openings are arranged at the upper and lower ends. The first, second, and third elements may be formed from round metal stock and machined to the required shapes necessary for practicing the invention. It should be noted that other durable materials may be formed or shaped to implement the invention.

During construction of the tool 1, the lower end of third element 13 is inserted through the oversized opening of guide collar 15, upper spring washer 17A, spring 14, lower spring washer 17B and fastened between ends of collar 19 via a pair of washers 35 and a pin or screw fastener. One end of guide collar 15 includes an opening that is substantially the same shape and diameter of the lower end of the vertical portion of the first element 11. This end of the guide collar is arranged about the lower end of the vertical portion of the first element 11 and fastened thereto.

Collar 19 is formed in a circular shape and includes two ends which include through openings for accepting a fastener to couple collar 19 to the lower end of element 13. Lobes, each having a through opening, are arranged substantially opposite one another to accept fasteners to couple respective shovel blades 16 to the collar 19.

As can be recognized by viewing the deconstructed elements in FIG. 5, the shovel blades are formed in an arcuate shape when viewed from either the upper or lower end. A pair of fastening lobes is provided along opposite sides of the upper edge and include through openings for coupling the blades to the collar 19 and to one another. A fastening lobe from one side of a shovel blade is overlapped onto a fastening lobe of the other shovel blade and fastened to a respective lobe of the collar 19.

As more clearly seen in FIG. 5, the second member 12 includes a forked end having a pair of forks. Each fork includes a through opening for accepting a pivot pin to couple the end to the first member 11. This type of coupling may be utilized for coupling the various members 11, 12, 13 together as well as the shovel blades 16A, 16B.

While the invention has been described with respect to preferred embodiments, it is intended that all matter contained in the above description or shown in the accompanying drawings shall be interpreted as illustrative and not in limiting sense. From the above disclosure of the general principles of the present invention and the preceding detailed description, those skilled in the art will readily comprehend the various modifications to which the present invention is susceptible. Therefore, the scope of the invention should be limited only by the following claims and equivalents thereof.

I claim:

1. A gardening tool comprising:
   a handle assembly having a first member that includes a free end arranged at one end of a horizontal portion that is formed substantially perpendicular to a vertical portion having a forked end, a flattened region is arranged on the vertical portion substantially near the horizontal portion, a through opening being provided in the flattened portion, a second member of the handle assembly being substantially horizontal and having a first end having a pair of forks arranged on opposite sides of the flattened portion, each fork having a through opening arranged on opposite ends of the through opening of the flattened portion and a pivot pin extending there through to pivotally couple the second member to the first member, a second end of the second member having a forked vertical portion having a pair of through openings and being pivotally connected to a third member having an upper vertical element arranged between the forked vertical portion of the second member, an offset middle portion of the third member formed at substantially forty-five degrees to the upper vertical portion of the third member and terminating in a lower vertical portion formed substantially forty-five degrees to the middle portion of the third member, a through opening provided substantially near an end of the lower vertical portion of the third member;
   a guide collar having two openings, a first opening arranged substantially near a lower end of the vertical portion of the first member of the handle assembly and a second opening arranged substantially near the second vertical portion of third member;
   a first washer arranged against the second opening of the guide collar and having a through opening, said second vertical portion of the third member extending there through;
   a second washer arranged apart from the first washer and having a through opening that accepts the second vertical portion of the third member;
   a spring arranged between the first washer and second washers in compression;
   a substantially circular second collar having two ends and three lobes, each end and lobe including a through opening, said two ends arranged on opposite sides of the end of the lower vertical portion of the third member;
   a pivot pin extending through the two ends of the substantially circular collar and the through opening of the end of the lower vertical portion of the third member to connect the handle assembly to the substantially circular collar in a pivotal manner;
   a pair of blades having an upper end and a rounded lower end and two longitudinal sides, one of said upper ends of one of the blades extending into the forked vertical portion of the first member of the handle assembly and fixed thereto;
   a first collar pivot pin connecting the one of the longitudinal sides of pair of blades to one of the longitudinal sides of the other blade and one of the lobes of the substantially circular collar; and,
   a second collar pivot pin connecting the other of the longitudinal sides of the pair of blades to the other of the longitudinal sides of the other blade and to the other of the lobes of the substantially circular collar.

2. The gardening tool of claim 1 further comprising a rubber handle arranged about the horizontal element of the first member and a rubber handle arranged about the second member.

3. The gardening tool of claim 1 wherein one of the first and second collar pivot pin comprises a threaded fastener having a nut.

4. The gardening tool of claim 1 wherein one of the first and second collar pivot pin comprises round metal stock press-fitted into the tool.

5. A gardening tool comprising:
   a handle assembly having a first member having a first portion and a second portion, said first portion of the first member being substantially horizontal, said second portion of the first member being substantially perpendicular to the first portion and vertical;
   said handle assembly further comprising a second member having a first end and a second end, said first end of the second member being pivotally connected to the first member;
   said handle assembly further comprising a third member having a first end and a second end substantially offset from one another, said first end of the third member being pivotally connected to the second end of the second member;
   a guide collar having a first opening and a second opening, said first opening of the guide collar being larger than the second opening;
   a spring arranged, in compression about the second end of the third member;
   a coupling collar having a plurality of lobes arranged thereon and being coupled to the second end of the third member; and,
   a pair of shovel blades having an upper end and a lower end and two sides, lobes arranged on opposite sides of the upper edge of each shovel blade, each of said lobes including a through opening and being pivotally arranged against a respective lobe of the opposite shovel blade and having a pivot pin extend through a respective through opening to couple the shovel blades to the coupling collar.

6. The gardening tool of claim 5 wherein said handle assembly further comprises a pair of spring washers arranged about the second end of the third member and against opposite ends of the spring.

7. The gardening tool of claim 5 wherein said tool is formed from metal.

8. The gardening tool of claim 5 further comprising a rubber handle arranged about the first member and a rubber handle arranged about the second member.

9. The gardening tool of claim 5 wherein a threaded fastener having a nut couples the pair of shovel blades together.

10. The gardening tool of claim 5 wherein at least on piece of round metal stock is press-fitted to couple the pair of shovel blades together.

* * * * *